(12) United States Patent
Hiruta et al.

(10) Patent No.: US 11,518,036 B2
(45) Date of Patent: Dec. 6, 2022

(54) SERVICE PROVIDING SYSTEM, SERVICE PROVIDING METHOD AND MANAGEMENT APPARATUS FOR SERVICE PROVIDING SYSTEM

(71) Applicant: Honda Motor Co., Ltd., Tokyo (JP)

(72) Inventors: Shigenori Hiruta, Wako (JP); Shiro Kitamura, Wako (JP); Daisuke Muramatsu, Tokyo (JP); Shuji Nakayama, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 129 days.

(21) Appl. No.: 16/650,775

(22) PCT Filed: Sep. 14, 2018

(86) PCT No.: PCT/JP2018/034161
§ 371 (c)(1),
(2) Date: Mar. 25, 2020

(87) PCT Pub. No.: WO2019/065303
PCT Pub. Date: Apr. 4, 2019

(65) Prior Publication Data
US 2020/0238529 A1     Jul. 30, 2020

(30) Foreign Application Priority Data

Sep. 29, 2017    (JP) .............................. JP2017-189796

(51) Int. Cl.
*B25J 9/16*      (2006.01)
*B25J 13/08*    (2006.01)
(Continued)

(52) U.S. Cl.
CPC ........... *B25J 9/1697* (2013.01); *B25J 13/085* (2013.01); *B25J 19/023* (2013.01); *G06F 3/016* (2013.01); *G06T 1/0014* (2013.01); *G06V 40/10* (2022.01)

(58) Field of Classification Search
USPC ................................................. 700/245–264
See application file for complete search history.

(56) References Cited

U.S. PATENT DOCUMENTS 6,292,713 B1 * 9/2001 Jouppi .................... G06F 3/011
                                                               715/733
6,549,215 B2 * 4/2003 Jouppi ................. G05D 1/0255
                                                               345/660
(Continued)

FOREIGN PATENT DOCUMENTS

JP       2000081917 A      3/2000
JP       2000218575 A      8/2000
(Continued)

*Primary Examiner* — Jonathan L Sample
(74) *Attorney, Agent, or Firm* — Duft & Bornsen, PC

(57) ABSTRACT

A service providing system including: a mobile robot configured to act in response to an instruction from a user through wireless communication and including a sensor having a capability corresponding to a human sensing capability to perceive an external world; a target identifying unit configured to identify whether an action target of the robot is a human being or another robot; an user apparatus control portion configured to output the signal detected by the sensor in a first manner when the action target is identified to be a human being and output the signal detected by the sensor in a second manner when the action target is identified to be the other robot; and a user apparatus configured to act in a manner perceivable by the user based on a output signal.

5 Claims, 9 Drawing Sheets

(51) Int. Cl.
 *B25J 19/02* (2006.01)
 *G06F 3/01* (2006.01)
 *G06T 1/00* (2006.01)
 *G06V 40/10* (2022.01)

(56) References Cited

U.S. PATENT DOCUMENTS

| | | | | |
|---|---|---|---|---|
| 7,756,322 | B2* | 7/2010 | Saitou | H04N 1/00244 382/153 |
| 8,718,822 | B1* | 5/2014 | Hickman | B25J 9/1674 700/214 |
| 9,043,025 | B2* | 5/2015 | Brooks | B25J 9/1676 700/255 |
| 9,160,783 | B2* | 10/2015 | Pinter | H04L 67/025 |
| 9,198,728 | B2* | 12/2015 | Wang | H04N 7/185 |
| 9,381,426 | B1* | 7/2016 | Hughes | H04L 67/06 |
| 9,821,455 | B1* | 11/2017 | Bareddy | H04N 7/15 |
| 9,872,968 | B2* | 1/2018 | de Zambotti | A61B 5/0205 |
| 9,878,445 | B2* | 1/2018 | Angle | G16H 70/40 |
| 10,109,108 | B2* | 10/2018 | Miller | G02B 27/0101 |
| 10,449,673 | B2* | 10/2019 | Hill | B25J 9/1666 |
| 2002/0013641 | A1* | 1/2002 | Nourbakhsh | G05D 1/0214 700/245 |
| 2005/0240310 | A1* | 10/2005 | Wang | B25J 9/1689 700/250 |
| 2007/0038331 | A1* | 2/2007 | Hanson | G16Z 99/00 700/258 |
| 2007/0061041 | A1* | 3/2007 | Zweig | G05D 1/0261 700/245 |
| 2007/0192910 | A1* | 8/2007 | Vu | B25J 19/06 901/17 |
| 2009/0055019 | A1* | 2/2009 | Stiehl | B25J 9/1671 901/17 |
| 2010/0121227 | A1* | 5/2010 | Stirling | A63B 24/0006 600/595 |
| 2011/0190930 | A1* | 8/2011 | Hanrahan | B25J 9/1689 700/259 |
| 2011/0288682 | A1* | 11/2011 | Pinter | G16H 40/67 700/259 |
| 2012/0185099 | A1* | 7/2012 | Bosscher | B25J 9/1689 700/264 |
| 2012/0316676 | A1* | 12/2012 | Fouillade | B25J 9/1697 901/1 |
| 2013/0093788 | A1* | 4/2013 | Liu | G02B 27/017 345/633 |
| 2013/0226344 | A1* | 8/2013 | Wong | B25J 9/1697 901/1 |
| 2013/0325244 | A1* | 12/2013 | Wang | G05D 1/0011 701/26 |
| 2014/0222206 | A1* | 8/2014 | Mead | G02B 5/20 700/259 |
| 2015/0094851 | A1* | 4/2015 | Kawabe | B25J 11/0005 901/1 |
| 2015/0190927 | A1* | 7/2015 | Sutherland | B25J 5/007 901/1 |
| 2015/0193940 | A1 | 7/2015 | Shoji | |
| 2015/0314454 | A1* | 11/2015 | Breazeal | B25J 11/001 700/259 |
| 2016/0046023 | A1* | 2/2016 | Nagendran | B25J 9/1605 700/258 |
| 2016/0070581 | A1* | 3/2016 | Soon-Shiong | G06F 9/453 715/705 |
| 2016/0180195 | A1* | 6/2016 | Martinson | G06N 7/005 382/103 |
| 2017/0015003 | A1* | 1/2017 | Sutherland | H04W 4/70 |
| 2017/0106738 | A1* | 4/2017 | Gillett | B62K 25/02 |
| 2019/0146518 | A1* | 5/2019 | Deng | B25J 19/023 382/118 |
| 2019/0369641 | A1* | 12/2019 | Gillett | G05D 1/0027 |

FOREIGN PATENT DOCUMENTS

| | | |
|---|---|---|
| JP | 2005064837 A | 3/2005 |
| JP | 2014026590 A | 2/2014 |

* cited by examiner

SERVICE PROVIDING SYSTEM, SERVICE PROVIDING METHOD AND MANAGEMENT APPARATUS FOR SERVICE PROVIDING SYSTEM

CROSS-REFERENCE TO RELATED APPLICATION

This application is a National Stage of PCT international application Ser. No. PCT/JP2018/034161 filed on Sep. 14, 2018 which designates the United States, incorporated herein by reference, and which is based upon and claims the benefit of priority from Japanese Patent Application No. 2017-189796, filed on Sep. 29, 2017, the entire contents of which are incorporated herein by reference.

TECHNICAL FIELD

This invention relates to a service providing system, a service providing method and a management apparatus for the service providing system for providing various services by using a mobile robot.

BACKGROUND ART

Systems of this type for moving remotely located robots in accordance with instructions transmitted from a user terminal through a network are known (see Patent Document 1, for example). In the system taught by Patent Document 1, the robot is equipped with a vision sensor and image signals acquired by the vision sensor are transmit through the network to the user terminal.

CITATION LIST

Patent Literature

Patent Literature 1: Japanese Unexamined Patent Publication No. 2005-64837

DISCLOSURE OF INVENTION

Problems to be Solved by the Invention

A point of interest here is that when a service utilizing such robots comes into widespread use, the robots become ubiquitous and robots of individual service users may come to be surrounded by other robots. As a result, users are apt to feel less that fully satisfied with the service provided.

Means for Solving Problem

An aspect of the present invention is a service providing system including: a mobile robot configured to act in response to an instruction from a user through wireless communication and including a detection unit having a capability corresponding to a human sensing capability to perceive an external world; a target identifying unit configured to identify whether an action target of the robot is a human being or another robot; an output unit configured to output the signal detected by the detection unit in a first manner when the action target is identified to be a human being by the target identifying unit and output the signal detected by the detection unit in a second manner when the action target is identified to be another robot; and a user apparatus configured to act in a manner perceivable by the user based on a signal output by the output unit.

Another aspect of the present invention is a service providing method for provide a service to a user by using a mobile robot acting in response to an instruction from a user through wireless communication and including a detection unit having a detection capability corresponding to a human sensing capability to perceive an external world and a user apparatus acting in a manner perceivable by the user, the service providing method including: identifying whether an action target of the robot is a human being or another robot; and outputting a signal detected by the detection unit in a first manner to the user apparatus when the action target is identified to be a human being by the target identifying unit and output the signal detected by the detection unit in a second manner when the action target is identified to be another robot.

Further aspect of the present invention is a management device for a service providing system including: a communication connection unit capable of transmitting and receiving a signal with a user apparatus and a robot; a target identifying unit configured to identify whether an action target of the robot is a human being or another robot based on the signal received from a robot through the communication connection unit; and an output unit configured to output the signal received from a robot to the user apparatus in a first manner through the communication connection unit when the action target is identified to be a human being by the target identifying unit and output the signal received from the robot to the user apparatus in a second manner through the communication connection unit when the action target is identified to be another robot.

Effect of the Invention

The present invention ensures provision of a service fully satisfactory to the user even when other robots are present in the vicinity of the user's robot.

DESCRIPTION OF EMBODIMENT

An embodiment of the present invention is explained below with reference to FIGS. 1 to 9. The service providing system according to this embodiment of the present invention activates actions of a robot located at a place apart from the user in response to instructions from a user, and offers the user services in a perceptible mode based on signals detected by the robot.

Although the robot can act individually in response to instructions from the user, an example is explained in the following in which the robot acts not individually but also together with third persons such as the user's family. The service providing system of the following example is adapted to deal with a situation in which a user arranges for a robot to join his or her family (or family member) in place of the user when they go out by themselves (on a trip, for example) without the user who cannot join them for some reason and is particularly adapted to provide the user with information obtained by the robot in such a situation. As a result, the user can, for example, enjoy a family outing just as if traveling with family even while staying home.

Figure 1:
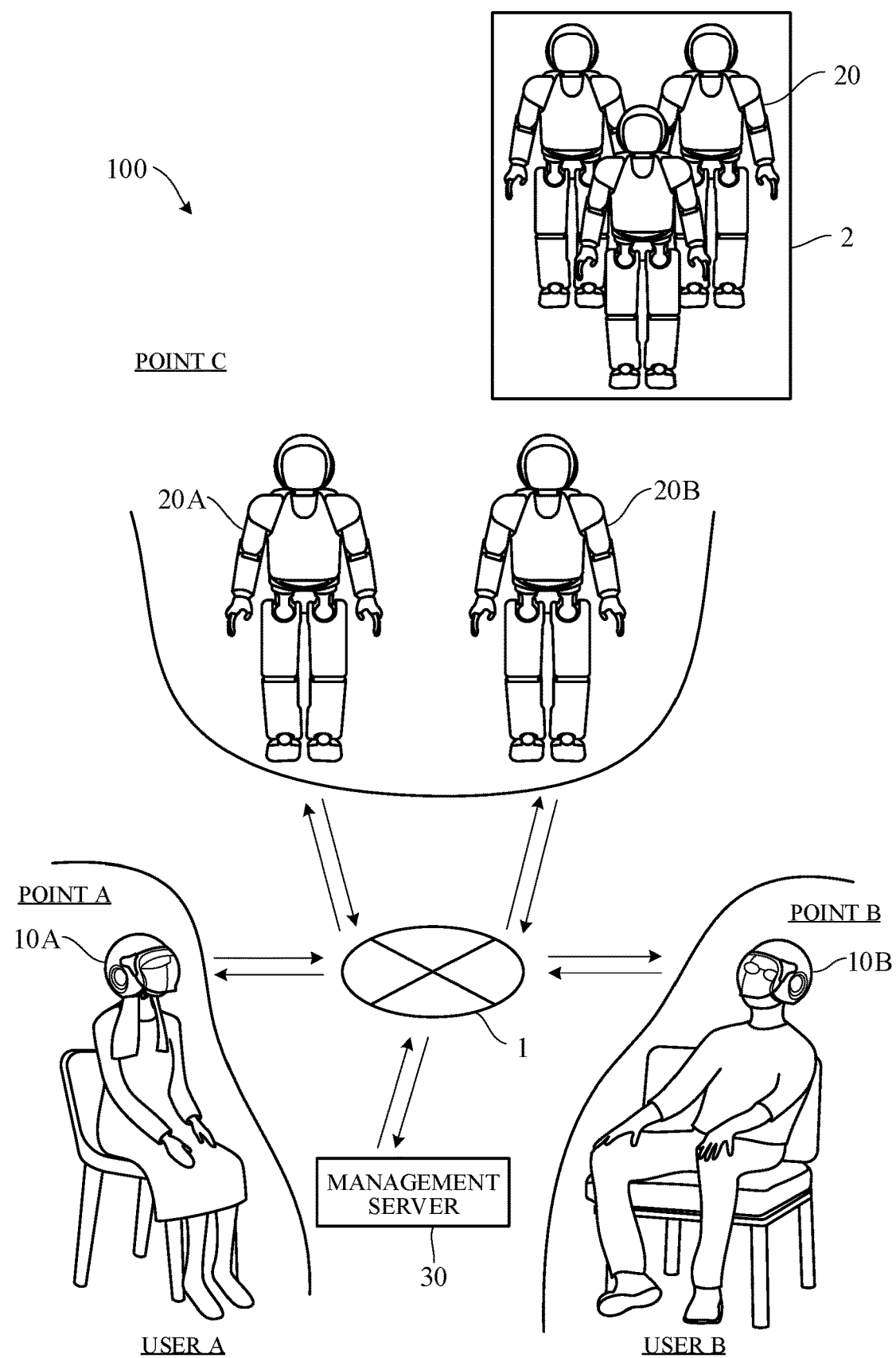
FIG. 1 is a diagram schematically showing overall configuration of a service providing system according to an embodiment of the present invention.

FIG. 1 is a diagram schematically showing overall configuration of a service providing system 100 according to an embodiment of the present invention. As shown in FIG. 1, the service providing system 100 is configured to comprise a user apparatus 10A worn by a user A at point A, a user apparatus 10B worn by a user B at point B, a robot 20A located at point C and operated by the user A at point A, a robot 20B located at point C and operated by the user B, and a management server 30.

The user apparatus 10A, robots 20A and 20B, and management server 30 are communicably interconnected by a network 1 including internet lines or other wireless communication network connection. User apparatus 10A and user apparatus 10B are identically configured, and both are sometimes indicated by reference symbol 10. Robots 20A and 20B are identically configured, and both are sometimes indicated by reference symbol 20.

A point, B point and C point are points separated from one another and may, for example, be in different regions. The different regions can be different countries. Also possible is for A point and B point to be the same point and C point to be a point apart from A and B points (remote point or region). The robots 20A and 20B at point C is rented at a shop 3 at or near point C. In other words, the robot 20A is rented from the shop 2 visited by the family of the user A and participates in the user A family's activities at point C. The robot 20B is rented from the shop 2 visited by the family of the user B and participates in the user B family's activities at point C. The family of users A and B returns the robots 20 A and B to the shop 2 after finishing their trip activities at point C. Each robot 20 available from the shop 2 has its own pre-assigned ID.

Figure 2:
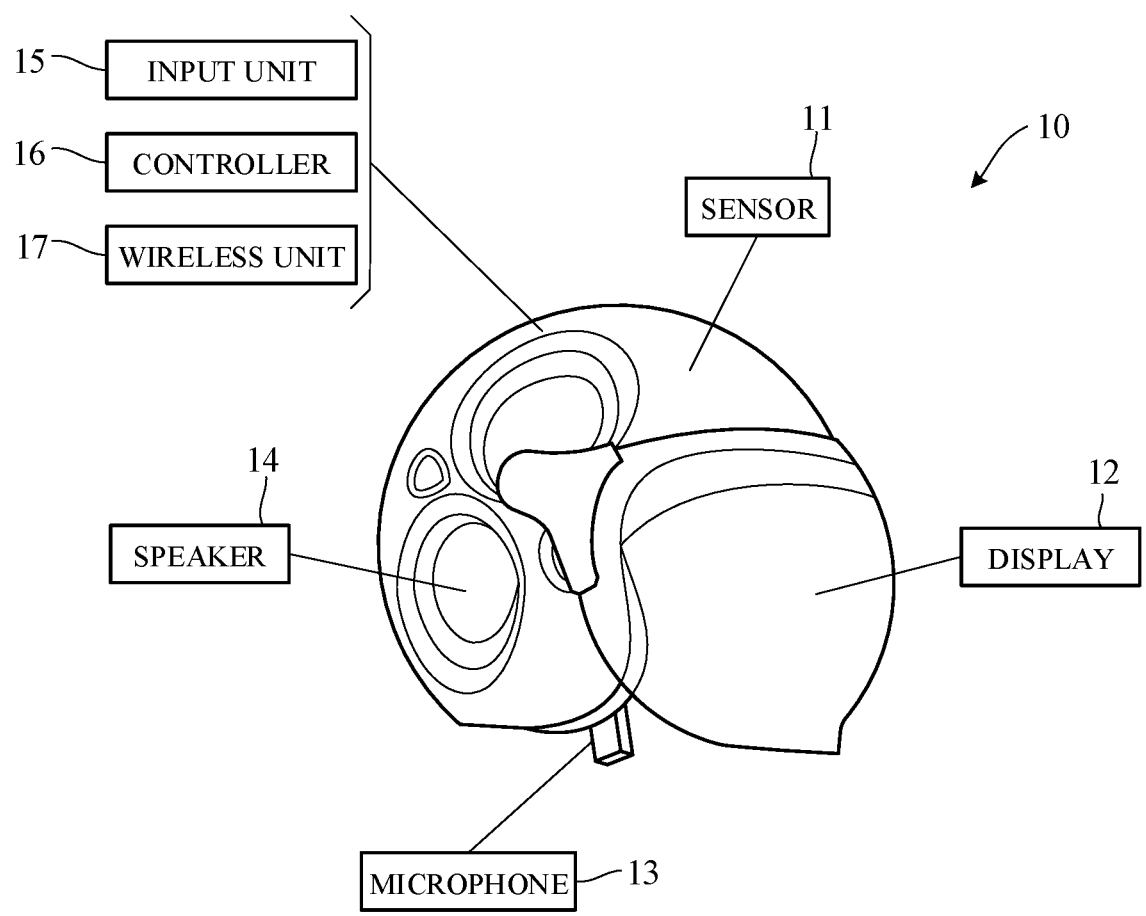
FIG. 2 is a diagram showing a configuration of the user apparatus of FIG. 1.

FIG. 2 is a diagram showing a configuration of the user apparatus 10. As shown in FIG. 2, the user apparatus 10 is a wearable computer shaped overall like a helmet, for example, and is worn on the user's head. The user apparatus 10 is provided with multiple sensors 11 for detecting brain activity such as user brain waves or magnetoencephalographic waves, and brain blood flow state. Namely, the user apparatus 10 is equipped with a so-called brain-machine interface (BMI) that detects user thoughts and intentions from brain activity signals and achieves mechanical operations without using body motions.

In addition, the user apparatus 10 has a display 12, microphone 13, speakers 14, input unit 15 controller 16 and wireless unit 17. The display 12 is, for example, a nontransparent head-mounted display positioned to surround both of the user's eyes and displays not only camera images from the robot 20 but also virtual reality 3D images. The microphone 13 is disposed at the user's mouth and receives voice signals produced by user utterances. The speakers are located near the user's ears and produce voice output. The input unit 15 is configured to comprise switches and a touch panel or the like operated by the user. Various data including user personal data and the like are input through the input unit 15.

The controller 16 includes a microcomputer comprising a CPU, ROM, RAM and the like. The controller 16 controls the wireless unit 17 and communicates with the management server 30. For example, the controller 16 sends the management server 30 signals received from the sensors 11 and microphone 13. In addition, the controller 16 sends the display 12 and speakers 14 control signals based on signals received from the management server 30.

Figure 3:
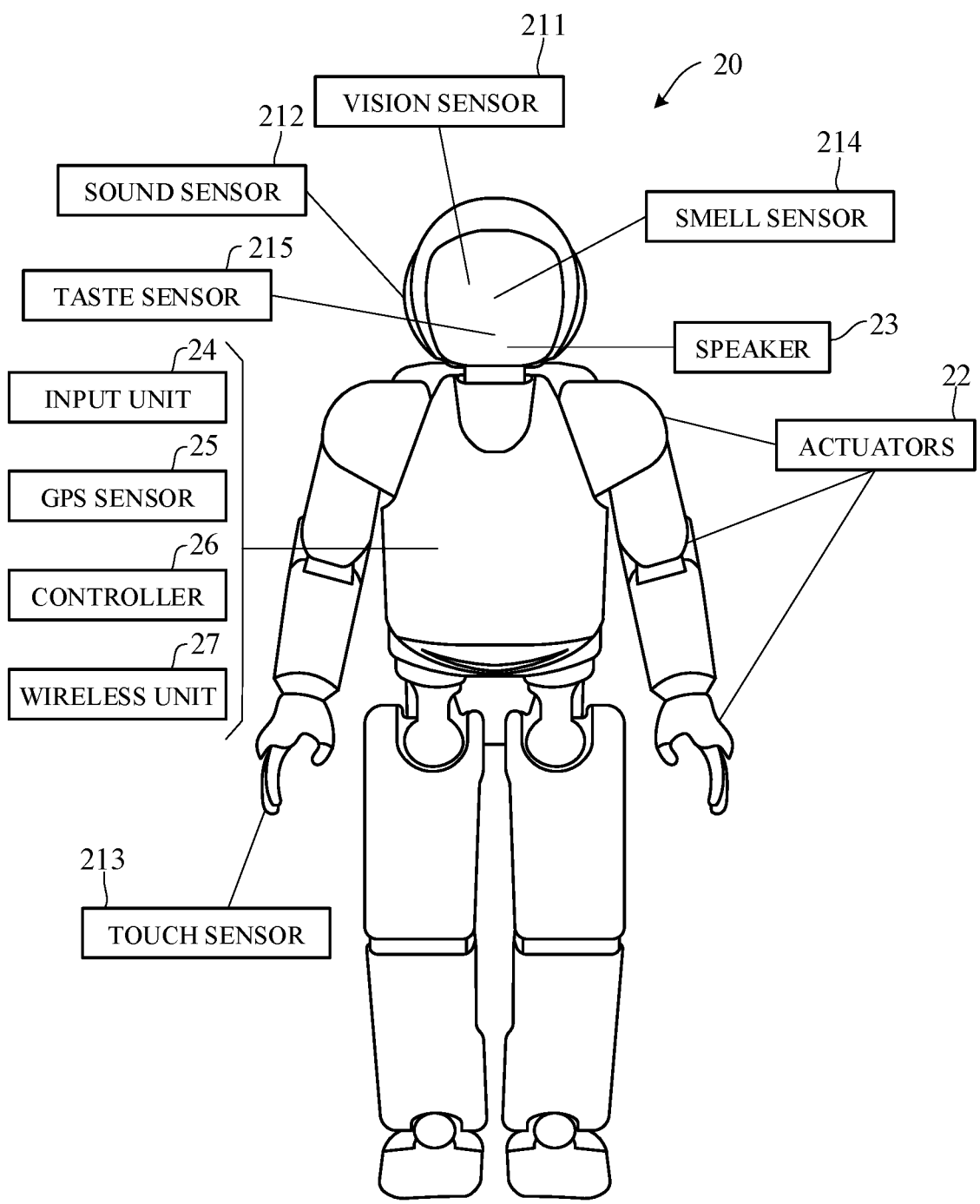
FIG. 3 is a diagram showing a configuration of the robot of FIG. 1.

FIG. 3 is a diagram showing structure of the robot 20. As shown in FIG. 3, the robot 20 is a humanoid robot having a head, trunk, two arms and two legs, and is capable of autonomous movement by biped walking. The robot 20 is nearly as tall as a human adult, with a height of around 140 to 160 cm, for example.

The robot 20 is equipped with multiple sensors possessing detection capabilities corresponding to the "five senses" traditionally recognized as sensing capabilities enabling humans to perceive the external world, namely, with at least one each of a vision sensor 211, sound sensor 212, touch sensor 213, smell sensor 214, and taste sensor 215. The sensors 211 to 215 output signals corresponding to the human five senses (five sense signals) as detection signals.

The vision sensor 211 comprises a camera having an imaging unit comprising a CMOS sensor, CCD sensor or other image sensor located at an eye position of the robot 20 and a lens, a drive unit for driving the imaging unit vertically and laterally, and a zoom mechanism for enlarging and shrinking subject images. The vision sensors 211 take images (video images) around the robot 20. The sound sensor 212 comprises a microphone located, for example, at an ear position of the robot 20. The sound sensors 212 pick up sounds around the robot 20. The touch sensor 213 comprises a force sensor located, for example, at a hand position of the robot 20. The touch sensors 213 detect external force acting on the hands of the robot 20. The smell sensor 214 is located at a nose position of the robot 20 and detects smells. The taste sensor 215 is located at a mouth position of the robot 20 and detects tastes.

The robot 20 additionally comprises at least one each of an actuator 22, speaker 23, input unit 24, GPS sensor 25, controller 26, and wireless unit 27. The actuators 22 include multiple motors or the like provided, for example, at associated joints of the robot 20. Robot 20 actions are implemented by driving the actuators 22. The speaker 23 is located at the mouth position of the robot 20 and produces voice output. The input unit 24 is equipped with a power switch and various other switches. The GPS sensor 25 receives GPS signals from GPS satellites. Position of the robot 20 can be detected using signals from the GPS sensor 25.

The controller 26 includes a microcomputer comprising a CPU, ROM, RAM and the like. The controller 26 controls the wireless unit 27 and communicates with the management server 30. For example, the controller 26 sends the five sense signals output by the sensors 211 to 215 and the signals from the GPS sensor 25 to the management server 30. In addition, the controller 26 sends control signals to the actuators 22, speaker 23 and so on based on signals from the management server 30.

Figure 4:
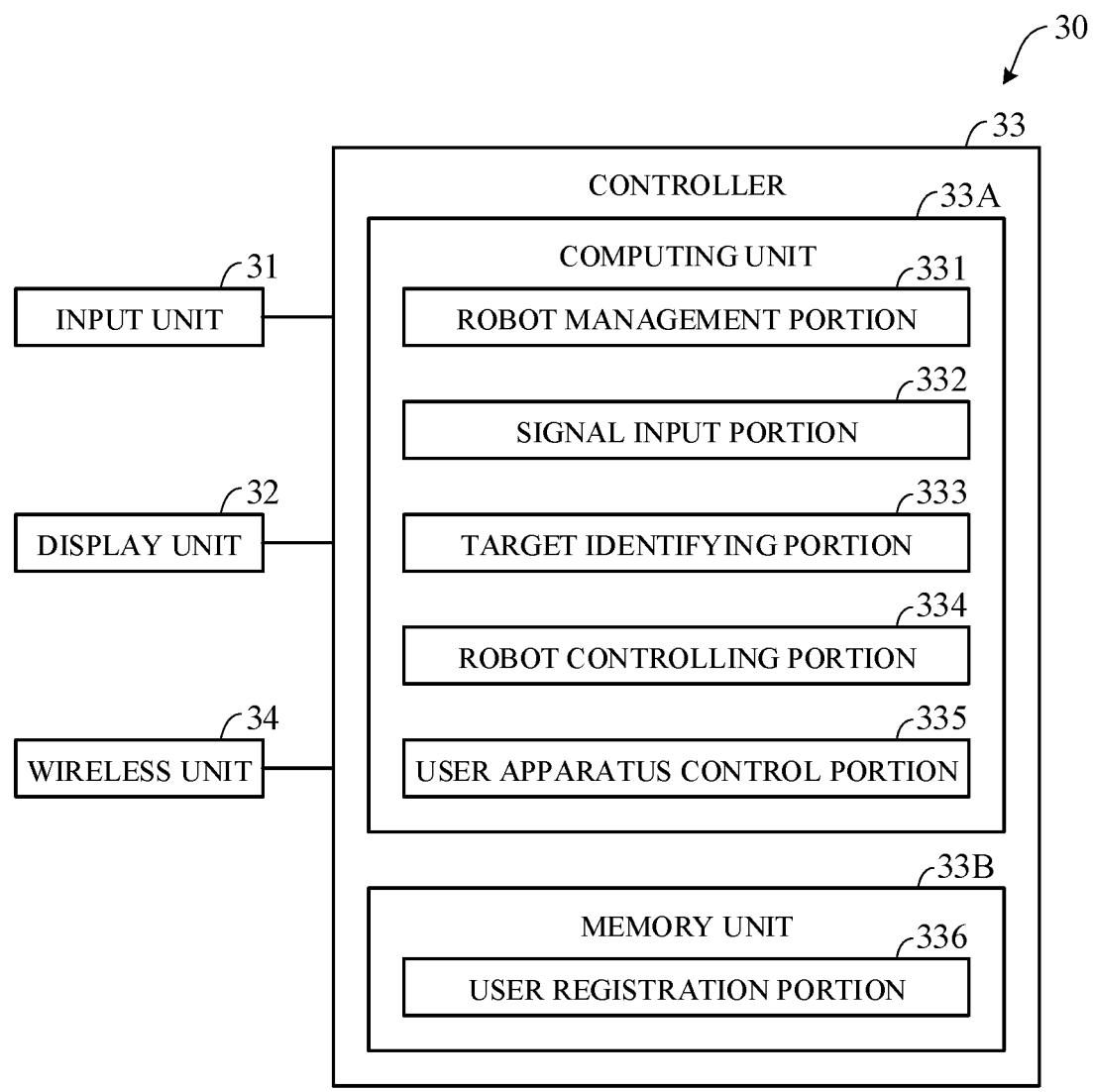
FIG. 4 is a block diagram showing configuration overview of a management server of FIG. 1.

FIG. 4 is a block diagram showing an example configuration overview of the management server 30. As shown in FIG. 4, the management server 30 comprises an input unit 31, display unit 32, controller 33 and wireless unit 34. Optionally, the input unit 31 and display unit 32 can be omitted.

The controller 33 comprises a CPU or other computing unit 33A, a memory unit 33B equipped with ROM, RAM, hard disk and the like, and other peripheral circuits. The controller 33 controls the wireless unit 34 and communicates with between the user apparatus 10 and the robot 20. The computing unit 33A comprises a robot management unit 331, a signal input section 332, a target identifying unit 333 and a robot controlling portion 334 and a user apparatus controlling portion 335 as functional constituents.

The user registration unit 336 stores user data. The stored user data include individual user names, age, sex, appearance and other attributes. The appearance data are obtained beforehand as a photograph or other image either taken by the user with a camera or scanned from a photograph or other image showing the user. The user apparatus controlling portion 335 is capable of using user data (particularly user appearance or other attribute data) to generate an image signal corresponding to user appearance. Data of each user are assigned a user-specific ID. User data can, for example, be input through the input unit 15 of the user apparatus 10 (FIG. 2). And when the user's family rents a robot 20 from a shop 2 (FIG. 1), the user data can optionally be input through a terminal of the shop 2.

The robot management unit 331 manages data of the robots 20 belonging to the shop 2 (rental data, maintenance data, etc.). When a robot 20 is to be rented, the robot management unit 331 associates a robot ID of the robot 20 concerned with the user ID of the user renting the robot 20. This specifies the attributes of users associated with individual robots 20.

The signal input section 332 is adapted to acquire data transmitted from the user apparatus 10 of individual users (from sensors 11, microphone 13, etc. of FIG. 2) and data transmitted from the individual robots 20 (sensors 211 to 215, GPS sensor 25, etc. of FIG. 3) through the wireless unit 34. The wireless unit 34 can fulfill its purpose insofar as configured to communicably connect the user apparatus 10 and the robot 20 (as a communication connection unit).

The target identifying unit 333 identifies whether an object (also called as a target) recognized by the vision sensor 211 (camera) of the robot 20 is a human being or is a robot 20. This identification can be achieved by, for example, performing pattern matching between images taken by the vision sensor 211 and images of the robot 20 stored in the memory unit 33B beforehand. Alternatively, whether a recognized target is the robot 20 can be determined by using signals from the GPS sensor 25 to detect positions of other robots 20 present around the robot 20 concerned.

The robot controlling portion 334 sends action signals for actuators 22 of the robot 20 through the wireless unit 34 based on signals (brain activity signals) from the sensors 11 of the user apparatus 10 which is input by the signal input section 332. In response to these actuation signals, the controller 26 of the robot 20 outputs control signals to the actuators 22. As a result, an action of the robot 20 is controlled in accordance with intention of the user. The robot controlling portion 334 can output a voice based on signals from the microphone 13 of the user apparatus 10 through the speaker 23 of the robot 20.

The user apparatus controlling portion 335 generates action signals for the user apparatus 10 based on signals (five sense signals) from the sensors 211 to 215 of the robot 20 which is input by the signal input section 332. These actions signals are then transmitted through the wireless unit 34 to the user apparatus 10. For example, picture signals detected by the vision sensors 211 are transmitted. In response to these picture signals, the controller 16 of the user apparatus 10 outputs control signals to the display 12 to display 3D pictures obtained from the vision sensors 211 on the display 12. The user apparatus controlling portion 335 can also use signals from the sound sensors 212 to reproduce voices through the speakers 14 of the user apparatus 10.

A point requiring attention here is that if the vision sensor 211 (camera) of the robot 20A operated by user A should take images of another robot (robot 20B operated by user B) and those images should be displayed as taken on the display 12 of the user apparatus 10A of the user A, the user A would be unlikely to feel thoroughly satisfied with the service provided via the user apparatus 10A. The reason for this dissatisfaction is that the meaningless appearance of the robot 20B serving as user B's avatar (double) on user A's display 12 when the user A is traveling would detract from the pleasure of the trip the user A had hoped to enjoy. With consideration to this issue, the user apparatus controlling portion 335 is adapted, as described in the following, to respond to identification result of the target identifying unit 333 by sending a control signal to the user apparatus 10 so as to control images displayed on the display 12.

Figure 5:
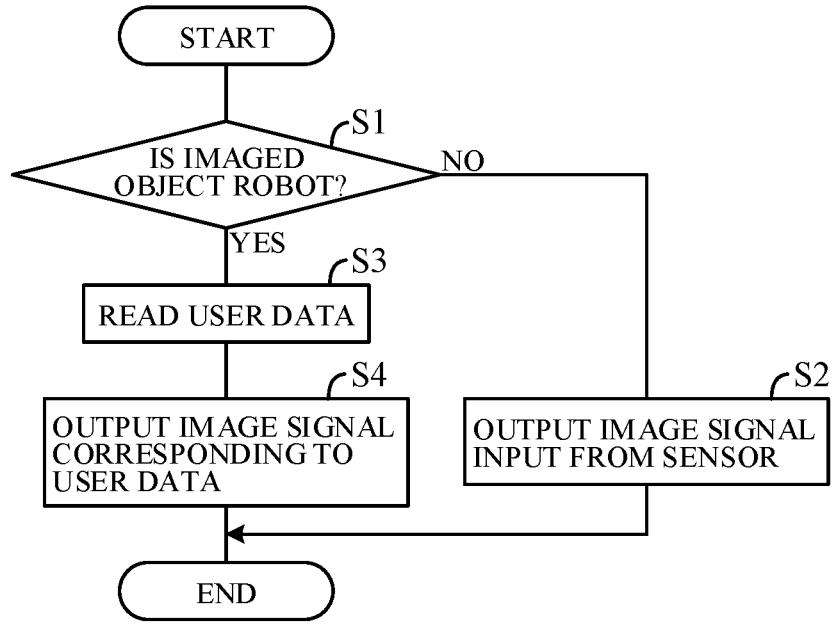
FIG. 5 is a flowchart showing an example of processing performed by a computing unit of FIG. 4.

FIG. 5 is a flowchart showing an example of processing performed by the computing unit 33A in accordance with a program stored in the memory unit 33B in advance, particularly an example of processing performed mainly by the user apparatus controlling portion 335. The processing represented by this flowchart is commenced when the vision sensor 211 starts taking a picture around of the robot 20 and is repeated at predetermined intervals.

First, in S1 (S: processing Step), whether an imaged object is a robot 20 is determined. This identification is performed by the target identifying unit 333. When the result in S1 is NO, i.e., when the imaged object is determined to be a human being or an object (object other than a robot), the program goes to S2, in which image signals are sent from the vision sensor 211 to the user apparatus 10 as is. This results in three-dimensional images (video images) taken by the vision sensor 211 being displayed as is on the display 12 of the user apparatus 10.

On the other hand, when the imaged object is determined in S1 to be a robot 20, the program goes to S3, in which data of the user operating the imaged robot 20 are read from the user registration unit 336. Next, in S4, the image signals of the robot 20 acquired by the vision sensor 211 are replaced by image signals representing user attributes (appearance) read from the user registration unit 336 and sent to the user apparatus 10. In other words, image signals that would be expected to be detected by the vision sensor 211 when the robot 20 is replaced by a human being are sent to the user apparatus 10. This results in display on the display 12 of the user apparatus 10 not of images of the robot 20 taken by the vision sensor 211 but instead of three-dimensional images (video images) of the user operating the imaged robot 20.

Figure 6:
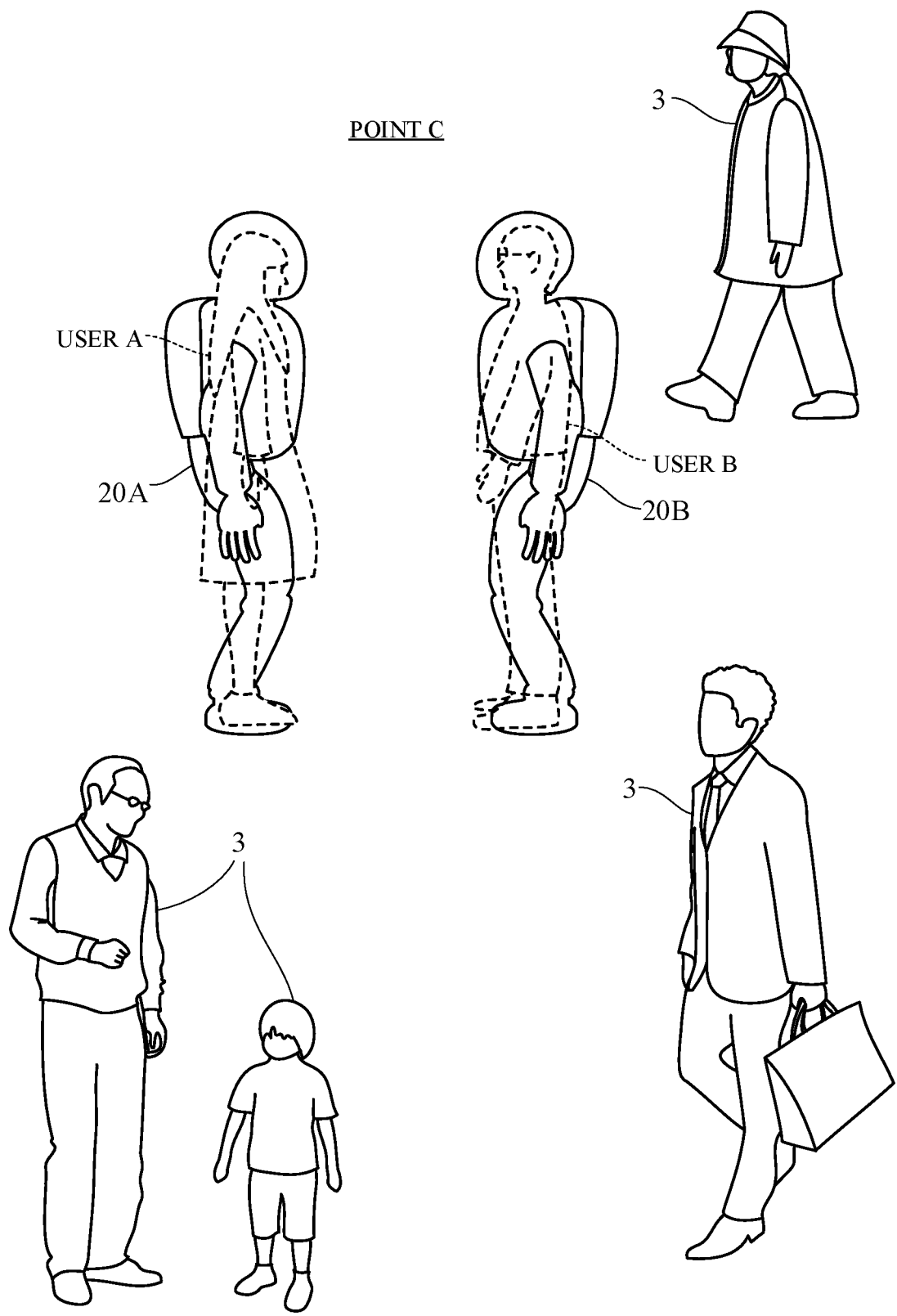
FIG. 6 is a diagram showing an example of action of a service providing system according to an embodiment of the present invention.

FIG. 6 is a diagram for explaining principal actions of the service providing system 100 according to an embodiment of the present invention. FIG. 6 shows the robot 20A (solid lines) operated by user A at A point (FIG. 1) and the robot 20B (solid lines) operated by user B at B point (FIG. 1) in mutually facing state at C point. At this time, a three-dimensional image of user B (dotted lines) is displayed on the display 12 of the user apparatus 10 of user A (S4) and a three-dimensional image of user A (dotted lines) is displayed on the display 12 of the user apparatus 10 of user B (S4). On the other hand, persons 3 present around the robots 20A and 20B are displayed as is on the displays 12 as three-dimensional images (S2).

Thus when the vision sensor 211 of a robot 20 operated by a user takes images of another robot, the images taken of that robot 20 are replaced by and displayed as images of a human being. Users can therefore thoroughly enjoy the service (image display) offered by the service providing system 100 using the robots 20 while experiencing no detraction from the pleasure of their travels. The replacement images of robots 20 taken by the vision sensors 211 with images of individual users makes it possible to offer a highly advanced service that enhances sense of reality, namely, feeling of the three-dimensional images displayed to the users depicting real spatial venues.

The present embodiment can achieve advantages and effects such as the following:

(1) The service providing system 100 according to the present embodiment includes: the robots 20 capable of moving, which are each equipped with the multiple sensors 211 to 215 having detection capability corresponding to five human senses and which are adapted to act in response to instructions from users by means of wireless communication; the target identifying unit 333 for identifying whether an object imaged by a robot 20 is a human being or is another robot 20; the user apparatus controlling portion 335 for outputting signals detected by the sensors (particularly the vision sensor 211) if an imaged object is identified to be a human being by the target identifying unit 333 and for replacing the signal detected by the vision sensor 211 with an image signal representing a user and outputting the same if the imaged object is identified to be another robot 20; and the user apparatus 10 (display 12) for displaying images (video images) of robot 20 surroundings based on signals output from the user apparatus controlling portion 335 (FIGS. 1 and 4). This makes it possible to prevent an image of a robot 20 in use as a person's avatar in the vicinity of the user's robot 20 from being displayed as is on the display 12 of the user's user apparatus 10. The user can therefore experience a high degree of satisfaction with the displayed image.

(2) When an imaged object is identified by the target identifying unit 333 to be a human being, the user apparatus controlling portion 335 outputs the signal detected by the vision sensor 211 as is (S2), and when the imaged object is identified to be another robot 20, the user apparatus controlling portion 335 outputs image signals that would be expected to be detected by the vision sensor 211 when the other robot 20 is replaced by a human being (S4). As the other robot 20 is therefore replaced by a human being for display on the users display 12, the user can savor the enjoyment of traveling without experiencing any unusual feeling.

(3) The service providing system 100 further comprises the user registration unit 336 for registering data, including attributes, of users using the robots 20 (FIG. 4). When the target identifying unit 333 identifies a target to be another robot 20, the user apparatus controlling portion 335 outputs signals that would be expected to be obtained by the vision sensor 211 when the other robot 20 is replaced by the other robot user by depicting attributes registered in the user registration unit 336 (S4). This leads to the user operating the other robot 20 being virtually displayed on the display 12 as if present and depicting the registered attributes at that venue. So even if a number of other robots 20 are present around the user's robot 20, the user can still enjoy a higher degree of satisfaction than in a case where users are virtually displayed uniformly and indistinguishably. This is because when users are virtually displayed uniformly and indistinguishably, they all look the same and give the user a strong feeling of unnaturalness that precludes thorough satisfaction with the service offered.

(4) The service providing method of the present embodiment, which is invoked in response to user instruction via wireless communication, is adapted to provide image display service to users by use of mobile robots 20 each equipped with the multiple sensors 211 to 215 having detection capability corresponding to five human senses and with the user apparatus 10 having the display 12 for displaying images of robot 20 surroundings, and includes identifying whether an object imaged by the robot 20 is a human being or is another robot 20 (S1), outputting signals detected by the sensors (particularly the vision sensor 211) to the user apparatus 10 as is if the imaged object is identified to be a human being (S2), and replacing the signal detected by the vision sensor 211 with an image signal representing a user and outputting the same to the user apparatus 10 if the imaged object is identified to be another robot 20 (S4). This makes it possible for the user to experience a high degree of satisfaction with the image displayed on the display 12.

The aforesaid embodiments are adapted to display images on the display 12 of the user apparatus 10 based on signals acquired from the vision sensor 211. Specifically, a head-mounted display is used as the user apparatus, but the user apparatus can be of any type insofar as it operates based on signals output by the user apparatus controlling portion 335 in a manner perceivable by the user. For example, it can be adapted to display images on the screen of a monitor not worn by the user. Optionally, images can be evoked in the user's mind by converting images to a mode for brain stimulation of images by BMI and magnetically stimulating the user's brain (light field of the occipital lobe, inter alia) accordingly. Optionally, services other than image services can be offered.

Figure 7:
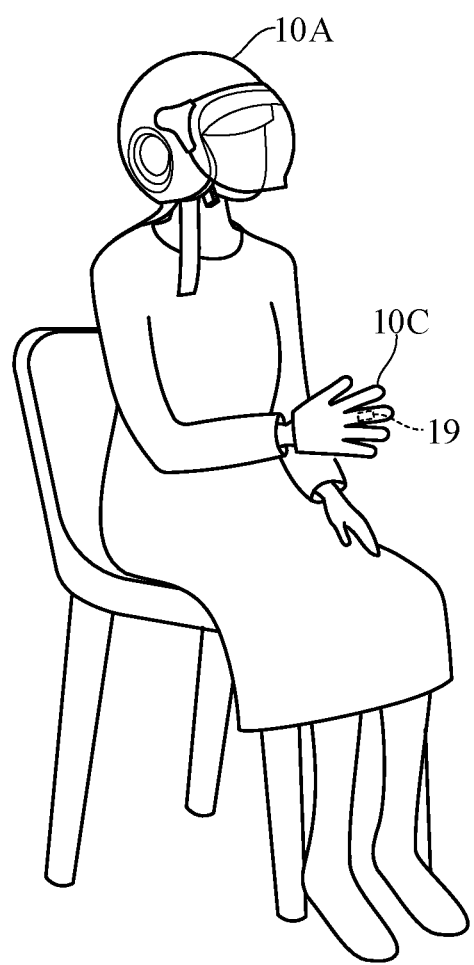
FIG. 7 is a diagram showing another example of the user apparatus of FIG. 1.

FIG. 7 is a diagram showing another example of user apparatus. In the example of FIG. 7, in addition to the user apparatus 10 (10A) fitted on the head, glove-shaped apparatus 10C, for example, is fitted on the user's hand. The user apparatus 10C is equipped with electric-signal-triggered actuators 19, at positions corresponding to finger joints of the user, for example, and with a controller (not shown) for controlling driving of the actuators 19. The user apparatus 10C extends and retracts when driven by the actuators 19 in response to instructions from the controller, thereby imparting a handshake sensation to the user.

Figure 8:
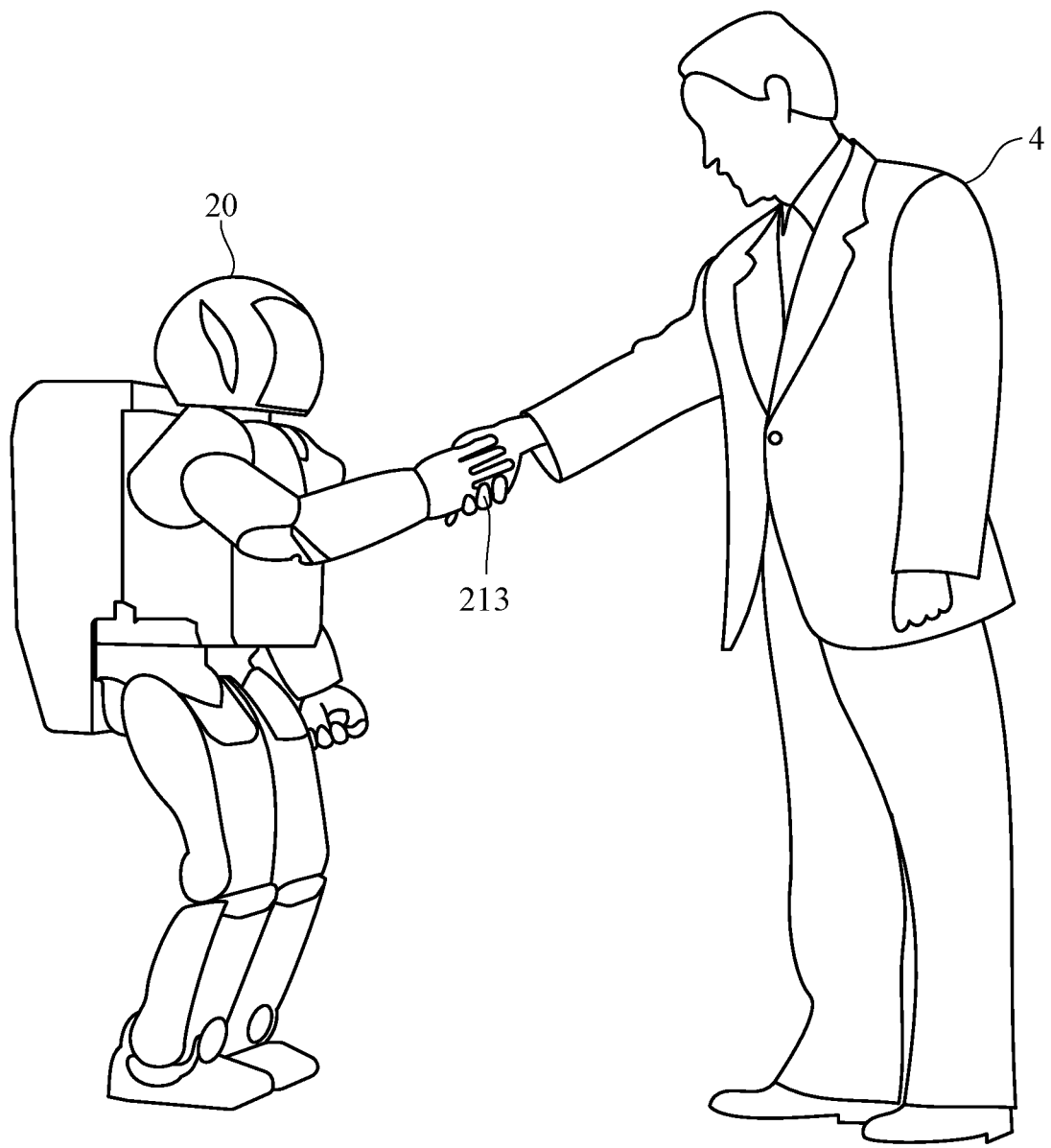
FIG. 8 is a diagram showing an example of action with the user apparatus of FIG. 7

So, as shown in FIG. 8, for example, when the robot 20 operated by the user shakes hands with third party 4, signals detected by the touch sensor 213 are sent to the management server 30. The management server 30 (user apparatus controlling portion 335) sends activation signals corresponding to these detection signals to the controller of the user apparatus 10C, thereby operating the actuators 19 to give the user a feeling of shaking hand with third party 4.

Figure 9:
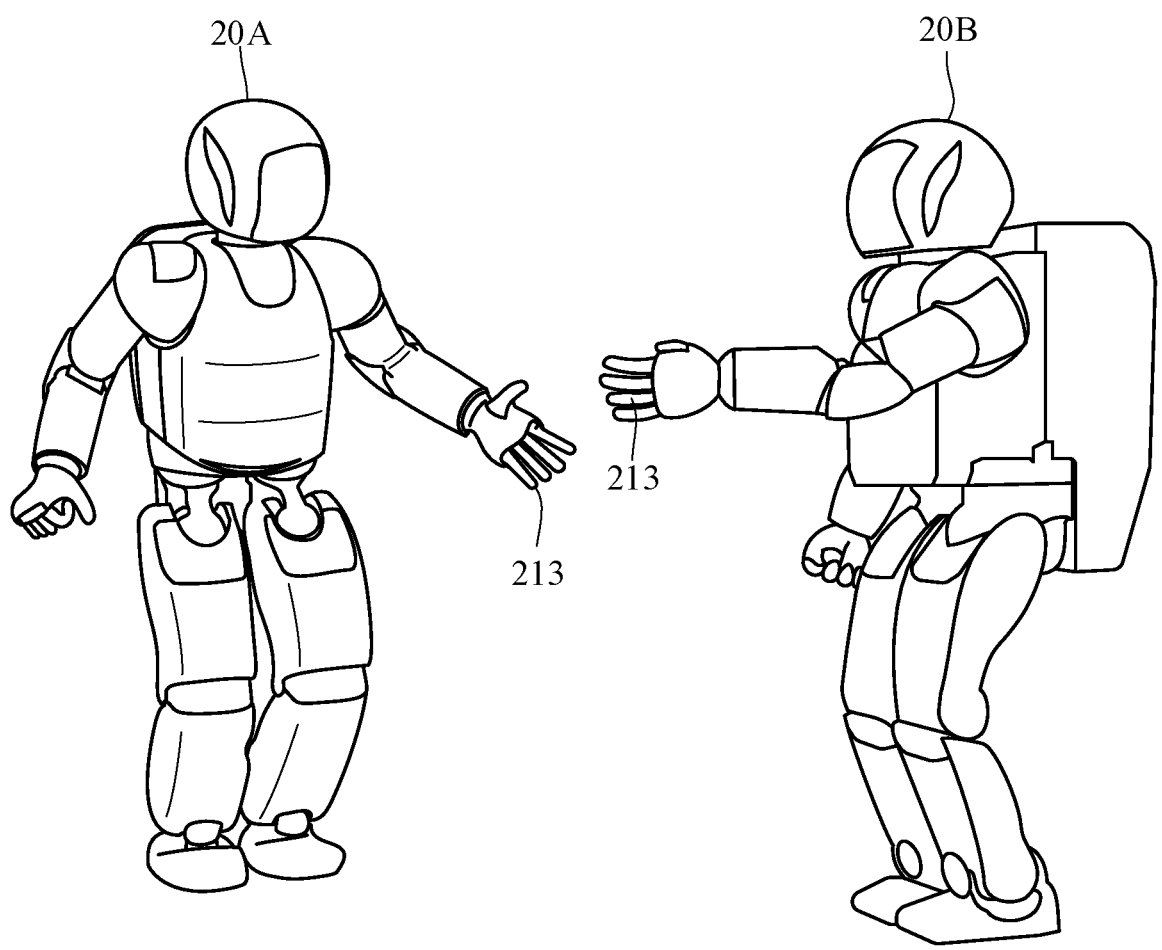
FIG. 9 is a diagram showing another example of action with the user apparatus of FIG. 7.

When the target identifying unit 333 identifies the entity with whom the robot 20A shakes hands to be a robot 20B operated by another user, the robots 20A and 20B can optionally be controlled as illustrated in FIG. 9 to not actually shake hands but to only shake hands in the image displayed on the user apparatus 10A. In such case, the management server (user apparatus controlling portion 335) sends the user apparatus 10A a signal simulating one that would be expected to be detected by the touch sensor 213 during an actual handshake. This expedient enables user A operating the robot 20A to receive a sensation of shaking hands with user B operating the robot 20B. Since the robots 20A and 20B are not required to actually shake hands with each other, needless actions of the robots 20A and 20B can be avoided.

The aforesaid embodiments are adapted to use a robot which is capable of biped walking, but the robot is not limited to the above configuration insofar as the robot includes human sensing capabilities to perceive the external world, i.e., capabilities corresponding to visual capabilities, tactile capabilities, etc. The above sensors 211 to 215 are examples of a detection unit including a capability corresponding to a human sensing capability, but the detection unit is not limited to the above configuration.

In the aforesaid embodiments, the target identifying unit 333 identifies whether a target to which the robot 20 takes images or shakes hands is a human being or another robot 20, but an operation target of a robot is not limited to the above target. It can be adapted to identify whether another operation target is a human or a robot. In addition, a target identifying unit is not limited to the above configuration.

The aforesaid embodiments are adapted to directly output a detection value of the sensor 211 when an action target (an object of taking pictures, for example) of the robot 20 is identified to be a human being by the target identifying unit 333 and output a signal that would be expected to be detected by the vision sensor 211 when another robot 20 is replaced by a human being when the action object (also called as action target) is it is identified to be the other robot 20. However, the user apparatus controlling portion 335 as an output unit is not limited to the above configuration insofar as a signal is output to a user apparatus such as the display 12 in mutually different manners (first manner, second manner) when an action target is identified to be a human being and when an action target is identified to be a robot. That is, if a signal is output in mutually different manners, a user can experience a higher degree of satisfaction with a provided service insofar as than in a case that a signal is output in mutually same manners. The user apparatus controlling portion 335 may always output irrespective of identification result of the target identifying unit 333, and the controller 16 of the user apparatus 10 may output a signal in a first manner and a second manner to respond to identification result of the target identifying unit 333. That is, the controller 16 may be function as an output unit instead of the user apparatus controlling portion 335.

The aforesaid embodiments are adapted to transmit and receive signals between the management server 30, the user apparatus 10 and the robot 20. Specifically, the user apparatus 10 and the robot 20 communicates trough the management server 30, but the user apparatus 10 and the robot 20 can communicates directly without the management server 30. In this case, controllers 16, 26, etc. of the user apparatus 10 and the robot 20 can include a function of the management server 30.

The aforesaid embodiments are adapted to rent the robot 20 form the shop 2, but for example, the present invention can be similarly configured even if a user uses a robot owned at home. It can be adapted not to make a robot act together with a family but to make a robot act individually. The management server 30 and a terminal of the shop 2 may be configured to be able to communicate with each other, and a rental reservation application, a rental fee payment, etc. of the robot 20 may be performed through the management server 30.

The above description is only an example, and the present invention is not limited to the above embodiment and modifications, unless impairing features of the present invention. The above embodiment can be combined as desired with one or more of the above modifications. The modifications can also be combined with one another.

REFERENCE SIGNS LIST 10, 10A user apparatus, 12 display, 19 actuator, 20, 20A, 20B robot, 100 service providing system, 211 vision sensor, 213 touch sensor, 333 target identifying unit, 335 user apparatus control portion, 336 user registration unit

The invention claimed is:

1. A service providing system comprising:
a robot capable of moving and configured to act in response to an instruction from a user through wireless communication and including a detection unit having a capability corresponding to a human sensing capability to perceive an external world, the detection unit including a camera;
a user apparatus including a display unit; and
a management device comprising: a controller including a CPU and a memory connected to the CPU; and a wireless unit connected to the controller and capable of communicating with the user apparatus and the robot, wherein
the CPU is configured to perform:
identifying whether an imaged object of the camera is a human being or another robot based on an image signal acquired by the camera received via the wireless unit; and
outputting an image signal representing a human being acquired by the camera to the user apparatus via the wireless unit when the imaged object is identified to be the human being and outputting an image signal in which another robot is replaced by another user using the other robot to the user apparatus via the wireless unit when the imaged object is identified to be the other robot, and
the display unit is configured to display an image based on the image signal outputted from the CPU, and wherein
the memory is configured to store user information including information of an appearance of the other user using the other robot, and
the CPU is configured to perform
the outputting including generating an image signal representing the appearance of the other user using the other robot based on the user information when the imaged object is identified to be the other robot to output an image signal in which an image signal representing the other robot acquired by the camera is replaced by the image signal representing the appearance of the user to the user apparatus via the wireless unit.

2. The service providing system according to claim 1, wherein
the display unit is further configured to display three-dimensionally an image of the other user based on the image signal representing an appearance of the other user using the other robot outputted from the CPU.

3. The service providing system according to claim 1, wherein
the detection unit further includes a force sensor,
the user apparatus has an actuator attached to a body of a user to impart a force detected by the force sensor to a predetermined part of the body of the user.

4. A service providing method for providing a service to a user by using a robot capable of moving and acting in response to an instruction from a user through wireless communication and including a detection unit having a detection capability corresponding to a human sensing capability to perceive an external world and a user apparatus acting in a manner perceivable by the user, the detection unit including a camera and the service providing method comprising:

identifying whether an imaged object of the camera is a human being or another robot based on an image signal acquired by the camera received from the robot; and outputting an image signal representing a human being acquired by the camera to the user apparatus when the imaged object is identified to be the human being and outputting an image signal in which another robot is replaced by another user using the other robot to the user apparatus when the imaged object is identified to be the other robot, wherein the outputting including generating an image signal representing an appearance of the other user using the other robot based on user information including information of the appearance of the other user using the other robot when the imaged object is identified to be the other robot to output an image signal in which an image signal representing the other robot acquired by the camera is replaced by the image signal representing the appearance of the user to the user apparatus via the wireless unit.

5. A management device for a service providing system comprising:

a controller including a CPU and a memory connected to the CPU; and a wireless unit connected to the controller and capable of communicating with a user apparatus including a display unit and a robot capable of moving and configured to act in response to an instruction from a user through wireless communication and including a detection unit having a capability corresponding to a human sensing capability to perceive an external world, the detection unit including a camera;

the CPU is configured to preform identifying whether an imaged object of the camera is a human being or another robot based on an image signal acquired by the camera received via the wireless unit; and outputting an image signal representing a human being acquired by the camera to the user apparatus via the wireless unit when the imaged object is identified to be the human being in the identifying and outputting an image signal in which another robot is replaced by another user using the other robot to the user apparatus via the wireless unit when the imaged object is identified to be the other robot in the identifying, wherein the memory is configured to store user information including information of an appearance of the other user using the other robot, and the CPU is configured to perform the outputting including generating an image signal representing the appearance of the other user using the other robot based on the user information when the imaged object is identified to be the other robot to output an image signal in which an image signal representing the other robot acquired by the camera is replaced by the image signal representing the appearance of the user to the user apparatus via the wireless unit.

\* \* \* \* \*